(12) United States Patent
Murakami

(10) Patent No.: US 10,287,921 B2
(45) Date of Patent: May 14, 2019

(54) COMBINED CYCLE PLANT, METHOD FOR CONTROLLING SAME, AND DEVICE FOR CONTROLLING SAME

(71) Applicant: MITSUBISHI HITACHI POWER SYSTEMS, LTD., Kanagawa (JP)

(72) Inventor: Masayuki Murakami, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 511 days.

(21) Appl. No.: 15/116,079

(22) PCT Filed: Mar. 3, 2015

(86) PCT No.: PCT/JP2015/056182
§ 371 (c)(1),
(2) Date: Aug. 2, 2016

(87) PCT Pub. No.: WO2015/141458
PCT Pub. Date: Sep. 24, 2015

(65) Prior Publication Data
US 2017/0152762 A1 Jun. 1, 2017

(30) Foreign Application Priority Data
Mar. 20, 2014 (JP) ................. 2014-058967

(51) Int. Cl.
*F01K 7/16* (2006.01)
*F01D 19/00* (2006.01)
(Continued)

(52) U.S. Cl.
CPC ............. *F01K 7/165* (2013.01); *F01D 19/00* (2013.01); *F01K 7/24* (2013.01); *F01K 11/02* (2013.01);
(Continued)

(58) Field of Classification Search
CPC . F01K 7/165; F01K 7/24; F01K 11/02; F01K 13/003; F01K 13/02; F01K 23/10;
(Continued)

(56) References Cited

FOREIGN PATENT DOCUMENTS

JP 61-98908 5/1986
JP 2-11807 1/1990
(Continued)

OTHER PUBLICATIONS

International Search Report dated Jun. 9, 2015 in International Application No. PCT/JP2015/056182 (with English translation).
(Continued)

*Primary Examiner* — Phutthiwat Wongwian
*Assistant Examiner* — Loren Edwards
(74) *Attorney, Agent, or Firm* — Wenderoth, Lind & Ponack, L.L.P.

(57) ABSTRACT

A first steam turbine and a second steam turbine of a combined cycle plant are connected by a reheat steam line via a reheat section of an exhaust heat recovery boiler. The reheat steam line and a condenser are connected by a second bypass line. A control device includes: a determination unit that determines whether or not the flow rate of first steam flowing into the first steam turbine has reached a stipulated flow rate; a command output unit that, upon determining that the flow rate of the first steam flowing into the first steam turbine has reached the stipulated flow rate, outputs a close command to close a ventilator valve that is provided in the second bypass line and is open; and a threshold alteration unit that alters the threshold with which the determination unit determines whether or not the stipulated flow rate has been reached, the threshold being positively correlated with a temperature of the first steam.

11 Claims, 4 Drawing Sheets

(51) Int. Cl.
*F01K 7/24* (2006.01)
*F01K 13/02* (2006.01)
*F01K 23/10* (2006.01)
*F01K 11/02* (2006.01)
*F01K 13/00* (2006.01)
*F02C 3/04* (2006.01)
*F02C 6/18* (2006.01)

(52) U.S. Cl.
CPC ............ *F01K 13/003* (2013.01); *F01K 13/02* (2013.01); *F01K 23/10* (2013.01); *F02C 3/04* (2013.01); *F02C 6/18* (2013.01); *F05D 2220/31* (2013.01); *F05D 2220/32* (2013.01); *F05D 2220/72* (2013.01); *F05D 2260/605* (2013.01); *F05D 2260/85* (2013.01); *Y02E 20/16* (2013.01)

(58) Field of Classification Search
CPC .... F01K 23/106; F01K 23/108; F01K 23/101; F01D 3/04; F01D 6/18; F05D 2220/31; F05D 2220/32; F05D 2220/72; F05D 2260/605; F05D 2260/85; Y02E 20/16

USPC .......................................................... 60/772
See application file for complete search history.

(56) References Cited

FOREIGN PATENT DOCUMENTS

| JP | 6-221112 | 8/1994 |
| JP | 2003-20905 | 1/2003 |
| JP | 2005-163628 | 6/2005 |
| JP | 2005-344528 | 12/2005 |
| JP | 2007-46577 | 2/2007 |
| JP | 2013-15043 | 1/2013 |
| JP | 2013-15044 | 1/2013 |
| JP | 2013-104411 | 5/2013 |

OTHER PUBLICATIONS

Written Opinion of the International Searching Authority dated Jun. 9, 2015 in International Application No. PCT/JP2015/056182 (with English translation).

Notice of Preliminary Rejection dated Jan. 19, 2017 in corresponding Korean Application No. 10-2016-7022110, with English translation.

US 10,287,921 B2

COMBINED CYCLE PLANT, METHOD FOR CONTROLLING SAME, AND DEVICE FOR CONTROLLING SAME

TECHNICAL FIELD

The present invention relates to a combined cycle plant including a gas turbine and a plurality of steam turbines, a method for controlling the same, and a device for controlling the same. This application claims priority based on Japanese Patent Application No. 2014-058967 filed in Japan on Mar. 20, 2014, of which the contents are incorporated herein by reference.

BACKGROUND ART

The plant disclosed in Patent Document 1 listed below can be given as an example of a plant including a plurality of steam turbines. This plant includes a boiler that generates steam, a plurality of steam turbines driven by the steam from the boiler, and a condenser that condenses steam exhausted from the steam turbines back into water. As the plurality of steam turbines, the plant includes a high-pressure steam turbine, a mid-pressure steam turbine, and a low-pressure steam turbine. Meanwhile, the boiler includes a steam generator that generates steam, a superheater that superheats the steam generated by the steam generator, and a repeater that reheats the steam.

The superheater of the boiler and a steam inlet of the high-pressure steam turbine are connected by a main steam line. A main steam stop valve and a main steam regulator valve are provided in the main steam line. A steam outlet of the high-pressure steam turbine and a steam inlet of the mid-pressure steam turbine are connected by a reheat steam line that conducts steam exhausted from the high-pressure steam turbine to the steam inlet of the mid-pressure steam turbine via the reheater of the boiler. A reheat steam stop valve and an intercept valve are provided in a part of the reheat steam line downstream from the reheater. A steam outlet of the mid-pressure steam turbine and a steam inlet of the low-pressure steam turbine are connected by a low-pressure steam line. A condenser that condenses steam exhausted from the low-pressure steam turbine back into water is provided in the low-pressure steam turbine. The condenser and the boiler are connected by a feed water line.

The main steam line and a part of the reheat steam line upstream from the reheater are connected by a high-pressure turbine bypass line. A high-pressure bypass valve is provided in the high-pressure turbine bypass line. A part of the reheat steam line upstream from the re heater and the condenser are connected by a ventilator line. A ventilator valve is provided in the ventilator line.

According to this plant, at startup, with the high-pressure turbine bypass valve and the ventilator valve in an open state, the high-pressure main steam stop valve opens and the high-pressure steam regulator valve gradually opens. During the start of circulation in the high-pressure steam turbine, windage loss of the high-pressure steam turbine causes the temperature of exhaust steam to rise. Accordingly, the rise in the temperature of the exhaust steam is suppressed by opening the ventilator valve, connecting the condenser to the steam outlet of the high-pressure steam turbine, and increasing a pressure difference between the inlet side and outlet side of the high-pressure steam turbine. The ventilator valve is closed upon a flow rate of high-pressure steam flowing into the high-pressure steam turbine, or in other words, a load of the high-pressure steam turbine reaching a predetermined load.

CITATION LIST

Patent Documents

Patent Document 1: Japanese Unexamined Patent Application Publication No. 2005-163628A (FIG. 4)

SUMMARY OF INVENTION

Technical Problem

According to the technique disclosed in the above-described Patent Document 1, when, during startup, the ventilator valve that has been in an open state is closed, the flow rate of the steam flowing in the reheat steam line will rise suddenly. There is thus a risk of a control system for the reheat steam line temporarily becoming unstable.

Accordingly, an object of the present invention is to provide a technique capable of preventing a control system from becoming unstable during startup.

Solution to Problem

To achieve the above-described object, a control device according to one aspect of the invention is a control device for a combined cycle plant. The combined cycle plant includes a gas turbine driven by a combustion gas, an exhaust heat recovery boiler that generates steam using heat of the combustion gas exhausted from the gas turbine, first and second steam turbines driven by the steam, and a condenser that condenses the steam exhausted from the second steam turbine back into water. The exhaust heat recovery boiler includes a first steam generating part that generates first steam to be supplied to the first steam turbine using the heat from the combustion gas, and a reheat section that heats the steam exhausted from the first steam turbine. The first steam generating part of the exhaust heat recovery boiler and the first steam turbine are connected by a first steam line that conducts the first steam to the first steam turbine. The first steam turbine and the second steam turbine are connected by a reheat steam line that conducts the steam exhausted from the first steam turbine to the second steam turbine via the reheat section of the exhaust heat recovery boiler. The first steam line and the reheat steam line are connected by a first bypass line. The reheat steam line and the condenser are connected by a second bypass line, and a ventilator valve that adjusts a flow rate of steam passing through the second bypass line is provided in the second bypass line. The control device includes: a determination unit that determines whether or not a flow rate of the first steam flowing into the first steam turbine has reached a stipulated flow rate in a process of starting up the first steam turbine and the second steam turbine; a command output unit that, upon the determination unit determining that the flow rate of the first steam flowing into the first steam turbine has reached the stipulated flow rate, outputs a close command to close the ventilator valve that is open; and a threshold alteration unit that alters a threshold with which the determination unit determines whether or not the stipulated flow rate has been reached, the threshold being positively correlated with a temperature of the first steam.

Assume that in this control device, the determination unit uses the same threshold for determining whether or not the stipulated flow rate has been reached in both a case where a large amount of the first steam is generated and a case where a small amount of the first steam is generated. In other words, assume that even in the case where a small amount of the first steam is generated, the control device determines that the flow rate of the first steam flowing into the first steam turbine has reached the stipulated flow rate using the same threshold as in the case where a large amount of the first steam is generated. Based on this assumption, even in the case where a small amount of the first steam is generated, the ventilator valve will close when the flow rate of the first steam flowing into the first steam turbine reaches the stipulated flow rate used in the case where a large amount of the first steam is generated. Accordingly, based on this assumption, even in the case where a small amount of the first steam is generated, the flow rate of the first steam flowing into the condenser via the ventilator valve immediately before the ventilator valve closes will be substantially the same as the stipulated flow rate used in the case where a large amount, of the first steam is generated. In addition, based on this assumption, the flow rate of the first steam flowing into the reheat steam fine via the first bypass line is lower than the flow rate of the first steam flowing into the reheat steam line via the first bypass line in the case where a large amount of the first steam is generated. Accordingly, based on this assumption, a flow change rate of the steam flowing in the reheat steam line between before and after the ventilator valve closes is greater in the case where a small amount of the first steam is generated than in the case, where a large amount of the first steam is generated. As such, there is a greater chance that a control system for the reheat steam line will become unstable in the case where a small amount of the first steam is generated.

Incidentally, in the process of starting up the plant, the temperature of the first steam from the first steam generating part and the amount of the first steam that is generated have a positive correlation. In other words, in the process of starting up the plant, a greater amount of the first steam is generated as the temperature of the first steam of the first steam generating part rises, whereas a smaller amount of the first steam is generated as the temperature of the first steam of the first steam generating part drops. This is because it is necessary to supply an exhaust gas having a high level of energy to the first steam generating part in order to raise the temperature of the first steam, and thus a greater amount of the first steam is inevitably generated. In addition, in the process of starting up the plant, the flow rate of the first steam supplied to the first steam turbine increases as the temperature of the first steam rises. Accordingly, in the process of starting up the plant, the temperature of the first steam and the flow rate of the first steam supplied to the first steam turbine have a positive correlation. This is because when the temperature of the first steam rises, a greater amount of steam is required to suppress a rise in the temperature of exhaust from an outlet of a high-pressure steam turbine.

Therefore, according to the control device, the threshold with which the determination unit determines whether or not the stipulated flow rate has been reached is altered with the threshold positively correlated with the temperature of the first steam. As such, according to the control device, the stipulated flow rate decreases when the amount of the first steam generated by the first steam generating part is small, and the flow change rate of the steam flowing in the reheat steam line between before and after the ventilator valve closes can be reduced.

Here, the control device according to the above-described aspect may further include a startup mode recognition unit that recognizes whether a startup mode of the exhaust heat recovery boiler is at least in cold mode or a hot mode, and the threshold alteration unit may alter the threshold in accordance with a temperature the first steam is presumed to be at in the startup mode recognized by the startup mode recognition unit.

In addition, in the control device including the startup mode recognition unit, the startup mode recognition unit may recognize the startup mode in accordance with a temperature of a steam contact part of the first steam turbine detected by a thermometer.

In addition, in the control device according to the above-described aspect, the threshold alteration unit may alter the threshold in accordance with a temperature of the first steam detected by a thermometer.

In addition, in any of the above-described control devices, the threshold may be a value regarding a pressure of the first steam flowing into the first steam turbine, and the determination unit may determine whether or not the flow rate of the first steam flowing into the first steam turbine has reached the stipulated flow rate on the basis of whether or not the pressure of the first steam flowing into the first steam turbine detected by a pressure gauge has reached the threshold.

To achieve the above-described object, a combined cycle plant according to one aspect of the invention includes any one of the above-described control devices, the gas turbine, the exhaust heat recovery boiler, the first steam turbine, the second steam turbine, and the condenser.

To achieve the above-described object, a control method according to one aspect of the invention is a control method for a combined cycle plant. The combined cycle plant includes a gas turbine driven by a combustion gas, an exhaust heat recovery boiler that generates steam using heat of the combustion gas exhausted from the gas turbine, first and second steam turbines driven by the steam, and a condenser that condenses steam exhausted from the second steam turbine back into water. The exhaust heat recovery boiler includes a first steam generating part that generates first steam to be supplied to the first steam turbine using the heat from the combustion gas, and a reheat section that heats the steam exhausted from the first steam turbine. The first steam generating part of the exhaust heat recovery boiler and the first steam turbine are connected by a first steam line that conducts the first steam to the first steam turbine. The first steam turbine and the second steam turbine are connected by a reheat steam line that conducts the steam exhausted from the first steam turbine to the second steam turbine via the reheat section of the exhaust heat recovery boiler. The first steam line and the reheat steam line are connected by a first bypass line. The reheat steam line and the condenser are connected by a second bypass line, and a ventilator valve that adjusts a flow rate of steam passing through the second bypass line is provided in the second bypass line. The control method includes the stops of: determining whether or not a flow rate of the first steam flowing into the first steam turbine has reached a stipulated flow rate in a process of starting up the first steam turbine and the second steam turbine; outputting, upon determining in the step of determining that the flow rate of the first steam flowing into the first steam turbine has reached the stipulated flow rate, a close command to close the ventilator valve that is open; and altering a threshold with which the determination is made in the step of determining whether or not the stipulated flow rate has been reached, the threshold being positively correlated with a temperature of the first steam.

In the same manner as the above-described control device, according to this control method, the flow change rate of the steam flowing in the reheat steam line between before and after the ventilator valve closes can be reduced.

Here, the control method according to the above-described aspect may further include a step of recognizing whether a startup mode of the exhaust heat recovery boiler is at least a cold mode or a hot mode, and in the step of altering a threshold, the threshold may be altered in accordance with a temperature the first steam is presumed to be at in the startup mode recognized in the step of recognizing a startup mode.

In addition, in the control method including the step of recognizing a startup mode, in the step of recognizing a startup mode, the startup mode may be recognized in accordance with a temperature of a steam contact part of the first steam turbine detected by a thermometer.

In addition, in the control method according to the above-described aspect, in the step of altering a threshold, the threshold may be altered in accordance with a temperature of the first steam detected by a thermometer.

In addition, in any of the above-described control methods, the threshold may be a value regarding a pressure of the first steam flowing into the first steam turbine, and in the step of determining, whether or not the flow rate of the first steam flowing into the first steam turbine has reached the stipulated flow rate may be determined on the basis of whether or not the pressure of the first steam flowing into the first steam turbine detected by a pressure gauge has reached the threshold.

Advantageous Effects of Invention

According to an aspect of the present invention, in the process of starting up a steam turbine, a flow change rate of steam flowing in a reheat steam line between before and after a ventilator valve closes can be reduced. As such, according to this aspect of the present invention, a control system for the reheat steam line can be prevented from becoming temporarily unstable.

BRIEF DESCRIPTION DRAWINGS

DESCRIPTION OF EMBODIMENT

An embodiment of a combined cycle plant according to the present invention will be described in detail hereinafter with reference to the drawings.

Figure 1:
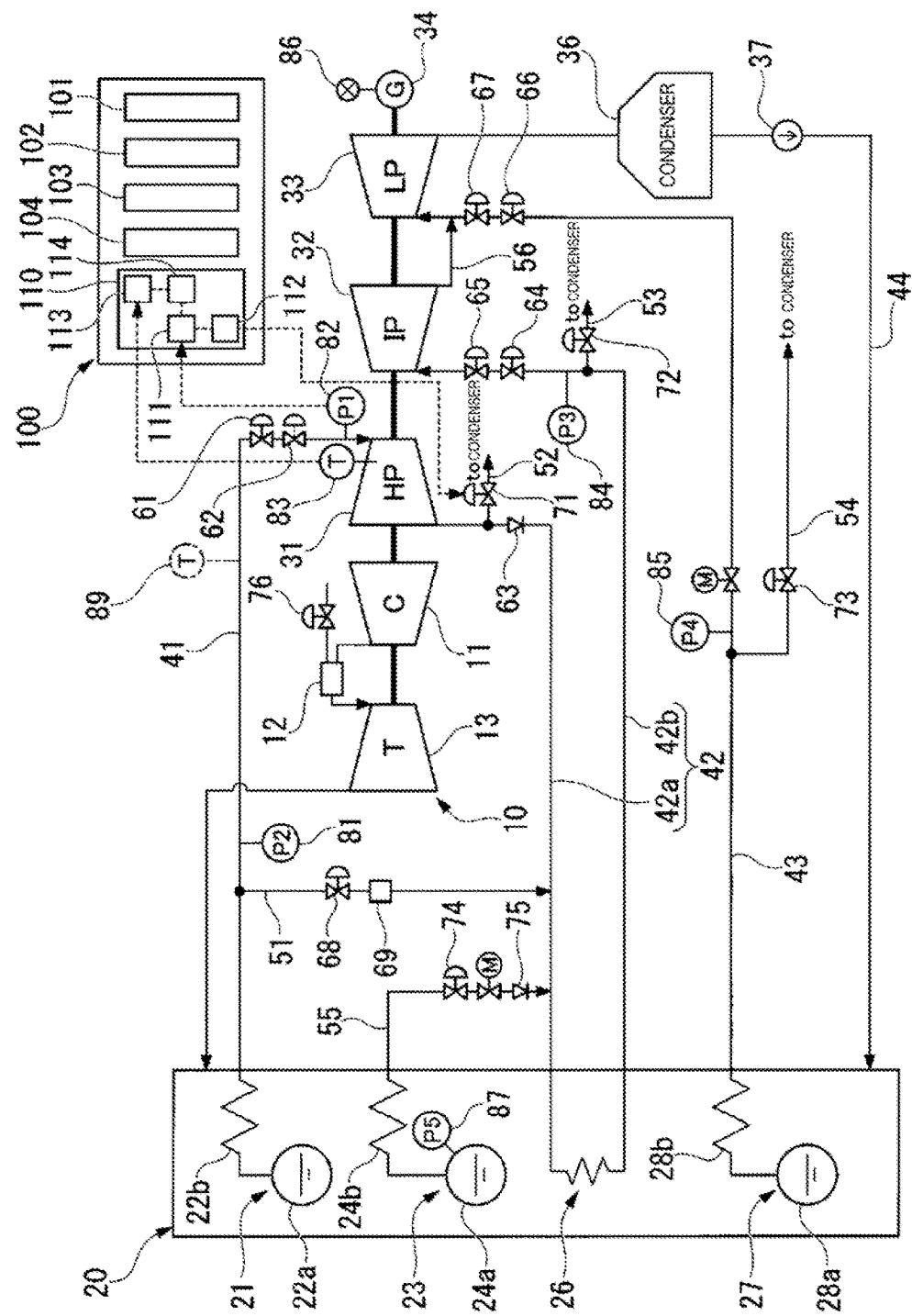
FIG. 1 is a system diagram illustrating a combined cycle plant according to an embodiment of the present invention.

As illustrated in FIG. 1, the combined cycle plant according to the present embodiment includes: a gas turbine 10; an exhaust heat recovery boiler 20 that generates steam using exhaust heat from a combustion gas exhausted from the gas turbine 10; a high-pressure steam turbine (first steam turbine) 31, a mid-pressure steam turbine (second steam turbine) 32, and a low-pressure steam turbine 33 driven by the steam from the exhaust heat recovery boiler 20; a generator 34 that generates power by being driven by the turbines 10, 31, 32, and 33; a condenser 36 that condenses steam exhausted by the low-pressure steam turbine 33 back into water; a feed water pump 37 that sends water from the condenser 36 to the exhaust heat recovery boiler 20; and a control device 100 that controls these elements. For the purposes of the following descriptions, it is assumed that the rated pressure of the high-pressure steam turbine 31 is 12 MPa, the rated pressure of the mid-pressure steam turbine 32 is 4 MPa, and the rated pressure of the low-pressure steam turbine 33 is 1 MPa.

The gas turbine 10 includes a compressor 11 that compresses outside air to generate compressed air, a combustor 12 that mixes the compressed air with a fuel gas and burns the mixture to generate a high-temperature combustion gas, a turbine 13 that is driven by the combustion gas, and a fuel flow rate adjustment valve 76 that adjusts a flow rate of the fuel supplied to the combustor 12.

A fuel line through which the fuel is supplied from a fuel supply source to the combustor 12 of the gas turbine 10 is connected to the combustor 12. The above-described fuel flow rate adjustment valve 76 is provided in this fuel line. An exhaust port of the turbine 13 of the gas turbine 10 is connected to the exhaust heat recovery boiler 20.

A compressor rotor of the compressor 11 and a turbine rotor of the turbine 13 are linked to each other on the same axis line, and rotate together as a gas turbine rotor. In the present embodiment, the gas turbine rotor, a turbine rotor of the high-pressure steam turbine 31, a turbine rotor of the mid-pressure steam turbine 32, a turbine rotor of the low-pressure steam turbine 33, and a generator rotor of the generator 34 are linked to each other on the same axis line, and rotate together. Accordingly, the combined cycle plant of the present embodiment is a single-shaft cot tined cycle plant.

The exhaust heat recovery boiler 20 includes a high-pressure steam generating part (first steam generating part) 21 that generates high-pressure steam (first steam) to be supplied to the high-pressure steam turbine 31, a mid-pressure steam generating part 23 that generates mid-pressure steam to be supplied to the mid-pressure steam turbine 32, a low-pressure steam generating part 27 that supplies to the low-pressure steam turbine 33, and a reheat section 26 that reheats steam exhausted from the high-pressure steam turbine 31. The high-pressure steam generating part 21 includes a high-pressure drum 22a that generates steam, and a high-pressure superheater 22b that superheats the steam generated by the high-pressure drum 22a. The mid-pressure steam generating part 23 includes a mid-pressure drum 24a that generates the mid-pressure steam, and a mid-pressure superheater 24b that superheats the mid-pressure steam generated by the mid-pressure drum 24a. A mid-pressure drum pressure gauge 87 that detects a pressure P5 within the mid-pressure drum 24a is provided in the mid-pressure drum 24a. The low-pressure steam generating part 27 includes a low-pressure drum 28a that generates steam, and a low-pressure superheater 28b that superheats the steam generated by the low-pressure drum 28a.

The high-pressure superheater 22b of the exhaust heat recovery boiler 20 and the steam inlet of the high-pressure steam turbine 31 are connected by a main steam line (first steam line) 41 that conducts the high-pressure steam from the high-pressure superheater 22b to the high-pressure steam turbine 31. A steam outlet of the high-pressure steam turbine 31 and a steam inlet of the mid-pressure steam turbine 32 are connected by a reheat steam line 42 that conducts steam exhausted from the high-pressure steam turbine 31 to the steam inlet of the mid-pressure steam turbine 32 via the reheat section 26 of the exhaust heat recovery boiler 20. Here, a part of the reheat steam line 42 between the steam outlet of the high-pressure steam turbine 31 and the reheat section 26 is referred to as a pre-reheat steam line 42a, and a part of the reheat steam line 42 between the reheat section 26 and the steam inlet, of the mid-pressure steam turbine 32 is referred to as a post-reheat steam line 42b. The low-pressure superheater 28b of the exhaust heat recovery boiler 20 and a steam inlet of the low-pressure steam turbine 33 are connected by a low-pressure steam line 43 that conducts low-pressure steam to the low-pressure steam turbine 33.

A steam outlet of the mid-pressure steam turbine 32 and a steam inlet of the low-pressure steam turbine 33 are connected by a mid-pressure turbine exhaust line 56. The condenser 36 is connected to the steam outlet of the low-pressure steam turbine 33. A feed water line 44 that conducts condensed water to the exhaust heat recovery boiler 20 is connected to the condenser 36. The aforementioned feed water pump 37 is provided on this feed water line 44.

The mid-pressure superheater 24b of the exhaust heat recovery boiler 20 and the pre-reheat steam line 42a are connected by a mid-pressure steam line 55. The main steam line 41 and the pre-reheat steam line 42a are connected by a high-pressure turbine bypass line (first bypass line) 51. The pre-reheat steam line 42a and the condenser 36 are connected by a ventilator line (second bypass line) 52. Note that a location of the pre-reheat steam line 42a where the high-pressure turbine bypass line 51 is connected is downstream (toward the reheat section 26) from the location where the ventilator line 52 is connected. In addition, a location of the pre-reheat steam line 42a where the mid-pressure steam line 55 is connected is downstream (toward the reheat section 26) from the location where the high-pressure turbine bypass line 51 is connected. The post-reheat steam line 42b and the condenser 36 are connected by a mid-pressure turbine bypass line 53, and the condenser 36 and the low-pressure steam line 43 are connected by a low-pressure turbine bypass line 54.

A high-pressure steam pressure gauge 81 that detects a pressure P2 of the high-pressure steam from the high-pressure superheater 22b, a main steam stop valve 61, a main steam regulator valve 62, and an inflow steam pressure gauge 82 are provided, in that order in the downstream direction, in a part of the main steam line 41 downstream (toward the high-pressure steam turbine 31) from where the high-pressure turbine bypass line 51 is connected. The high-pressure steam pressure gauge 81 detects the pressure P2 of the high-pressure steam from the high-pressure superheater 22b upstream (toward the high-pressure steam generating part 21) from the main steam stop valve 61. The inflow steam pressure gauge 82 detects a pressure P1 of the high-pressure steam downstream from the main steam regulator valve 62. In other words, the inflow steam pressure gauge 82 detects the pressure P1 of the high-pressure steam immediately before the high-pressure steam flows into the high-pressure steam turbine 31.

A thermometer 83 that detects a temperature of a first-stage vane ring (steam contact part) of the high-pressure steam turbine 31 is provided in the first-stage vane ring.

A high-pressure turbine bypass valve 68 and a desuper-heater 69 are provided in the high-pressure turbine bypass line 51. A mid-pressure drum pressure adjustment valve 74 that adjusts a pressure within the mid-pressure drum 24a and a cheek valve 75 that prevents steam from the pre-reheat steam line 42a from flowing into the mid pressure drum 24a are provided in the mid-pressure steam line 55.

A check valve 63 is provided in a part of the pre-reheat steam line 42a downstream (toward the reheat section 26) from where the ventilator line 52 is connected. This check valve 63 prevents steam that has flowed into the pre-reheat steam line 42a via the high-pressure turbine bypass line 51 or the mid-pressure steam line 55 from flowing into the high-pressure steam turbine 31. A ventilator valve 71 is provided in the ventilator line 52.

A reheat steam pressure gauge 84, a reheat steam stop valve 64, and a reheat steam regulator valve 65 are provided, in that order in the downstream direction, in a part of the post-reheat steam line 42b downstream (toward the mid-pressure steam turbine 32) from where the mid-pressure turbine bypass line 53 is connected, A mid-pressure turbine bypass valve 72 is provided in the mid-pressure turbine bypass line 53.

A low-pressure steam pressure gauge 85, a low-pressure steam stop valve 66, and a low-pressure steam regulator valve 67 are provided, in that order in the downstream direction, in a part of the low-pressure steam line 43 downstream (toward the low-pressure steam turbine 33) from where the low-pressure turbine bypass line 54 is connected. A low-pressure turbine bypass valve 73 is provided in the low-pressure turbine bypass line 54.

Figure 2:
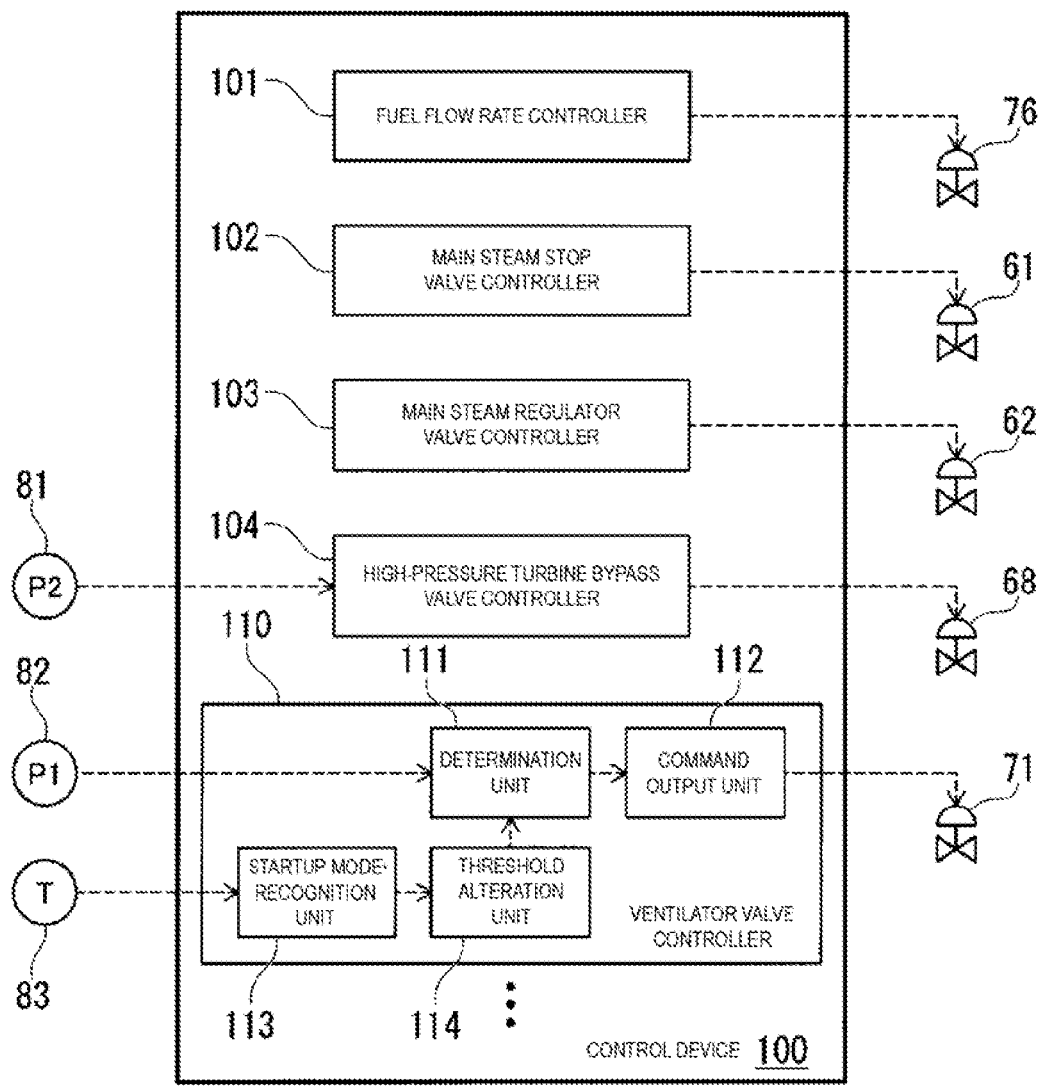
FIG. 2 is a function block diagram illustrating a control device according to the embodiment of the present invention.

As illustrated in FIG. 2, the control device 100 includes a fuel flow rate controller 101 that controls operations of the fuel flow rate adjustment valve 76, a main steam stop valve controller 102 that controls operations of the main steam stop valve 61, a main steam regulator valve controller 103 that controls operations of the main steam regulator valve 62, a high-pressure turbine bypass valve controller 104 that controls operations of the high-pressure turbine bypass valve 68, and a ventilator valve controller 110 that controls operations of the ventilator valve 71. In addition to those mentioned above, the control device 100 includes controllers and the like that control operations of the reheat steam stop valve 64, the reheat steam regulator valve 65, the low-pressure steam stop valve 66, the low-pressure steam regulator valve 67, the mid-pressure turbine bypass valve 72, the low-pressure turbine bypass valve 73, and the mid-pressure drum pressure adjustment valve 74.

The ventilator valve controller 110 includes a determination unit 111 that determines whether or not the pressure P1 of the high-pressure steam detected by the inflow steam pressure gauge 82 has reached a threshold, a command output unit 112 that outputs a close command to the ventilator valve 71 upon the determination unit 111 determining that the pressure P1 of the high-pressure steam has reached the threshold, a startup mode recognition unit 113 that recognizes a startup mode of the exhaust heat recovery boiler 20 by the temperature of the high-pressure steam turbine 31 detected by the thermometer 83, and a threshold alteration unit 114 that alters the threshold for the determination unit 111 in accordance with the startup mode recognized by the startup mode recognition unit 113.

The startup mode of the exhaust heat recovery boiler 20 includes, for example, a hot mode corresponding to starting up with the high-pressure steam turbine 31 in a high-temperature state and a cold mode corresponding to starting up with the high-pressure steam turbine 31 in a low-temperature state. The startup mode recognition unit 113 recognizes that the mode is the hot mode in the case where the temperature of the high-pressure steam turbine 31 detected by the thermometer 83 is greater than or equal to 400° C., for example, immediately before steam is supplied to the high-pressure steam turbine 31. Meanwhile, the startup mode recognition unit 113 recognizes that the mode is the cold mode in the case where the temperature of the high-pressure steam turbine 31 detected by the thermometer 83 is less than 400° C., for example, immediately before steam is supplied to the high-pressure steam turbine 31.

The control device 100 according to the present embodiment is constituted by a computer, and the processes performed by the units of the control device 100 are all realized by a storage device including an external storage device, such as a hard disk drive device, and a memory, and a CPU that executes a program stored in the storage device.

Next, operations performed during a startup process of the combined cycle plant according to the present embodiment will be described.

Upon receiving a startup command from the exterior, the control device 100 outputs a startup command to a startup device (not illustrated) to start up the startup device. As a result of the startup of the startup device, the compressor rotor and the turbine rotor of the gas turbine 10 begin rotating. When the compressor rotor rotates, the compressed air from the compressor 11 begins being supplied to the combustor 12. Upon the compressor rotor and the turbine rotor reaching a predetermined rotating speed, for example, the fuel flow rate controller 101 outputs an open command to the fuel flow rate adjustment valve 76. As a result, fuel from the fuel line begins being supplied to the combustor 12 via the fuel flow rate adjustment valve 76. This fuel burns in the compressed air supplied to the combustor 12 from the compressor 11. The combustion gas generated by the combustor 12 flows into the turbine 13, rotating the turbine rotor.

Figure 3:
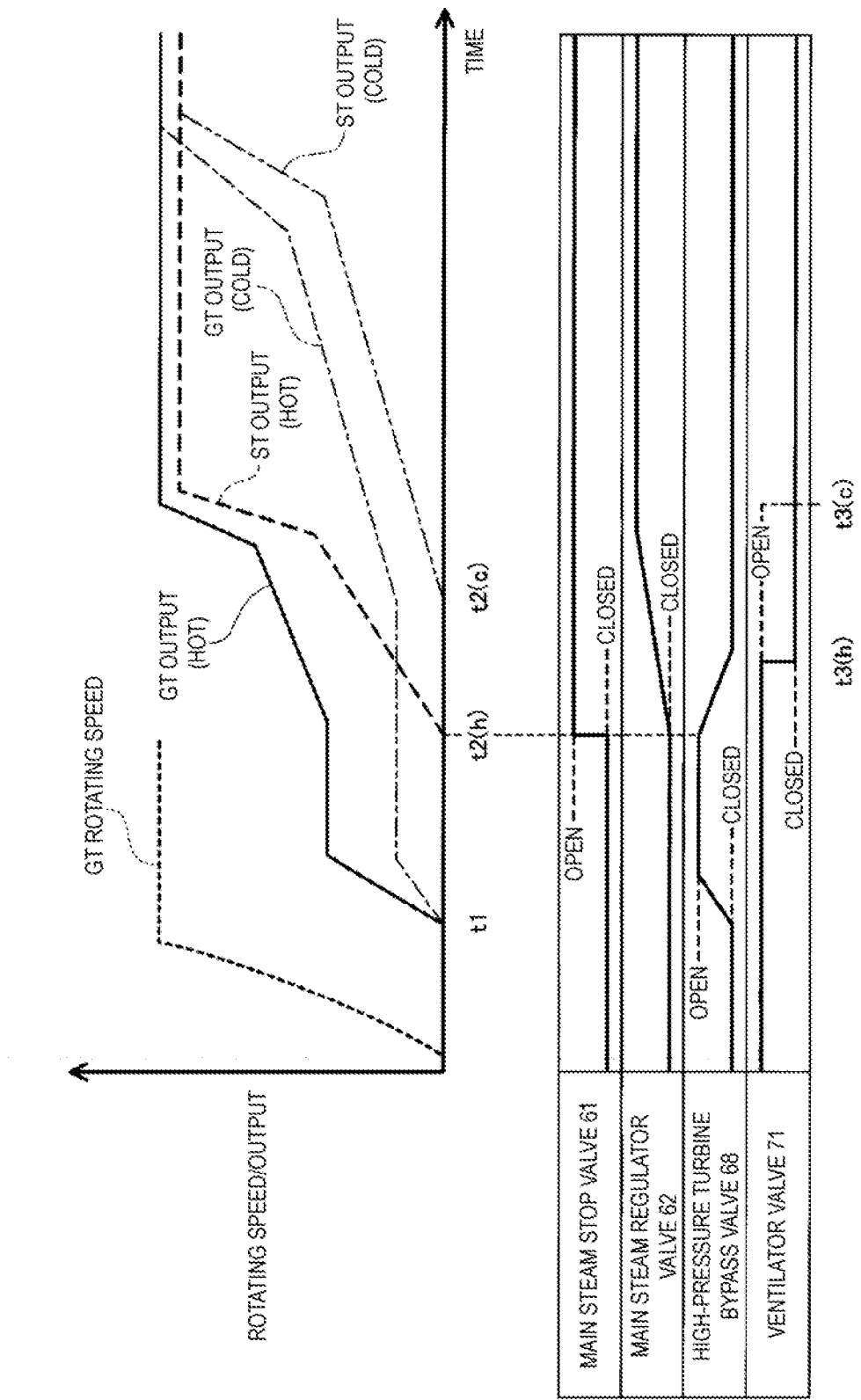
FIG. 3 is a timing chart showing changes over time in outputs and valve operations in the case where a startup mode is a hot mode in the combined cycle plant according to the embodiment of the present invention.

In the process of starting up the gas turbine 10, the fuel flow rate controller 101 outputs an open command indicating a lift based on a predetermined pattern according to which the fuel flow rate adjustment valve 76 progressively opens as time passes. As such, the flow rate of the fuel supplied to the combustor 12 increases progressively as well, and as shown in FIG. 3, the rotating speed of the turbine rotor also increases progressively. Once the turbine rotor reaches the predetermined rotating speed, the startup device stops assisting the rotation of the turbine rotor. Then, once the rotating speed of the turbine rotor reaches a rated rotating speed, for example, 3,600 rpm, the generator 34 is connected to a system power line, and the rotating speeds of the turbine rotor and the generator 34 rotor are held at that rated rotating speed.

The combustion gas that has passed through the turbine 13 is supplied to the exhaust heat recovery boiler 20 as exhaust gas. In the steam generating parts 21, 23, and 27 of die exhaust heat recovery boiler 20, heat exchange occurs between the exhaust gas and water flowing in the exhaust heat recovery boiler 20, heating the water to generate steam. The high-pressure steam generated by the high-pressure steam generating part 21 flows into the main steam line 41. The mid-pressure steam generated by the mid-pressure steam generating part 23 flows into the mid-pressure steam line 55. The low-pressure steam generated by the low-pressure steam generating part 27 flows into the low-pressure steam line 43.

Before the generation of steam is started by the exhaust heat recovery boiler 20, the main steam stop valve 61, the main steam regulator valve 62, the reheat steam stop valve 64, the reheat steam regulator valve 65, the low-pressure steam stop valve 66, the low-pressure steam regulator valve 67, the high-pressure turbine bypass valve 68, the mid-pressure turbine bypass valve 72, the low-pressure turbine bypass valve 73, and the mid-pressure drum pressure adjustment valve 74 are all closed. However, the ventilator valve 71 is open before the generation of steam is started by the exhaust heat recovery boiler 20.

In the process of starting up the plant, the low-pressure turbine bypass valve 73 is controlled by the control device 100 so that a pressure P4 of the low-pressure steam line 43 is held at, for example, 0.5 MPa, which is lower than the rated pressure of 1 MPa of the low-pressure steam turbine 33. As such, the low-pressure turbine bypass valve 73 is closed until the pressure P4 of the low-pressure steam detected by the low-pressure steam pressure gauge 85 reaches 0.5 MPa. Upon the amount of low-pressure steam generated by the low-pressure steam generating part 27 increasing to the point where the pressure P4 of the low-pressure steam line 43 is greater than or equal to 0.5 MPa, the low-pressure turbine bypass valve 73 opens and the low-pressure steam from the low-pressure steam generating part 27 flows into the condenser 36 via the low-pressure turbine bypass line 54.

The control device 100 controls the mid-pressure drum pressure adjustment valve 74 so that the mid-pressure drum 24a is held at a predetermined pressure, for example, a pressure somewhat greater than the rated pressure of 4 MPa of the mid-pressure steam turbine 32. Accordingly, when the pressure within the mid-pressure drum 24a becomes greater than or equal to the pressure to be held, the mid-pressure drum pressure adjustment valve 74 opens and the mid-pressure steam generated by the mid-pressure drum 24a flows into the pre-reheat steam line 42a via the mid-pressure steam line 55.

In the process of starting up the plant, the mid-pressure turbine bypass valve 72 is controlled by the control device 100 so that a pressure P3 of the post-reheat steam line 42a is held at, for example, 2 MPa, which is lower than the rated pressure of 4 MPa of the mid-pressure steam turbine 32. As such, the mid-pressure turbine bypass valve 72 is closed until the pressure P3 of the reheated (mid-pressure) steam detected by the reheat steam pressure gauge 84 reaches 2 MPa. Once the amount of mid-pressure steam generated by the mid-pressure steam generating part 23, the flow rate of the steam arriving via the high-pressure turbine bypass line 51, and the like increase and the pressure P3 of the post-reheat steam line 42b becomes greater than or equal to 2.0 MPa, the mid-pressure turbine bypass valve 72 opens and the steam flowing through the post-reheat steam line 42b flows into the condenser 36 via the mid-pressure turbine bypass line 53.

In the process of starting up the plant, the high-pressure turbine bypass valve 68 is controlled by the high-pressure turbine bypass valve controller 104 of the control device 100 so that the pressure P2 of the main steam line 41 is held at, for example, 5 MPa, which is lower than the rated pressure of 12 MPa of the high-pressure steam turbine 31. Accordingly, as shown in FIG. 3, the high-pressure turbine bypass valve 68 is closed until the pressure P2 of the high-pressure steam detected by the high-pressure steam pressure gauge 81 reaches 5 MPa. When the amount of high-pressure steam generated by the high-pressure steam generating part 21 increases and the pressure P2 of the main steam line 41 becomes greater than or equal to 5 MPa, the high-pressure turbine bypass valve 68 opens and the high-pressure steam from the high-pressure steam generating part 21 flows into the reheat steam line 42 via the high-pressure turbine bypass line 51.

During the process of starting up the plant, upon recognizing that the condition for starting the supply of the steam supplied to each of the steam turbines 31, 32, and 33 is met, the control device 100 opens the steam stop valves 61, 64, and 66 and the steam regulator valves 62, 65, and 67 of the steam turbines 31, 32, and 33. The temperature detected by the thermometer 83 provided in the high-pressure steam turbine 31 reaching a predetermined temperature can be given as an example of the condition for starting the supply of steam. At this time, the steam regulator valves 62, 65, and 67 gradually open in accordance with predetermined lilt patterns. As a result, as shown in FIG. 3, the steam begins being supplied to each of the steam turbines 31, 32, and 33, and a steam turbine output (a total output of the high-pressure steam turbine 31, the mid-pressure steam turbine 32, and the low-pressure steam turbine 33) gradually increases.

Note that here, the temperature detected by the thermometer 83 provided in the high-pressure steam turbine 31 reaching a predetermined temperature is used as the condition for starting the supply of steam. However, both the temperature detected by the thermometer 83 provided in the high-pressure steam turbine 31 reaching the predetermined temperature and the temperature detected by a thermometer provided in the mid-pressure steam turbine 32 reaching a predetermined temperature may be used as the condition for starting the supply of steam.

Upon the low-pressure steam stop valve 66 and the low-pressure steam regulator valve 67 opening and the low-pressure steam beginning to be supplied to the low-pressure steam turbine 33, the pressure P4 of the low-pressure steam line 43 decreases. Accordingly, the control device 100 gradually closes the low-pressure turbine bypass valve 73 to hold the pressure P4 of the low-pressure steam line 43.

Upon the reheat steam stop valve 64 and the reheat steam regulator valve 65 opening and steam beginning to be supplied to the mid-pressure steam turbine 32, the pressure P3 of the post-reheat steam line 42*b* decreases. Accordingly, the control device 100 gradually closes the mid-pressure turbine bypass valve 72 to hold the pressure P3 of the post-reheat steam line 42*b*.

Upon the main steam stop valve 61 and the main steam regulator valve 62 opening and the high-pressure steam beginning to be supplied to the high-pressure steam turbine 31, the pressure P2 of the main steam line 41 decreases. Accordingly, as shown in FIG. 3, the high-pressure turbine bypass valve controller 104 gradually closes the high-pressure turbine bypass valve 68 to hold the pressure P2 of the main steam line 41.

Then, upon recognizing that a switching condition for the steam to be supplied to the steam turbines 31, 32, and 33 is met, the control device 100 changes the pressures held in the steam lines supplying steam to the steam turbines 31, 32, and 33. Specifically, the control device 100 controls the low-pressure turbine bypass valve 73 so that the pressure P4 of the low-pressure steam line 43 is held at a pressure of 1.1 MPa that is slightly higher than the rated pressure of 1 MPa of the low-pressure steam turbine 33, for example. As such, once the above-described switching condition has been met, the low-pressure turbine bypass valve 73 does not open as long as the pressure P4 in the low-pressure steam line 43 does not become greater than or equal to 1.1 MPa. In addition, upon recognizing that the above-described switching, condition has been met, the control device 100 controls the mid-pressure turbine bypass valve 72 so that the pressure P3 in the post-reheat steam line 42*b* is held at a pressure of 4.1 MPa that is slightly higher than the rated pressure of 4 MPa of the mid-pressure steam turbine 32. As such, once the above-described switching condition has been met, the mid-pressure turbine bypass valve 72 does not open as long as the pressure P3 in the post-reheat steam line 42*b* does not become greater than or equal to 4.1 MPa. In addition, upon recognizing that the above-described switching condition has been met, the high-pressure turbine bypass valve controller 104 of the control device 100 controls the high-pressure turbine bypass valve 68 so that the pressure P2 in the main steam line 41 is held at a pressure of 12.1 MPa it that is slightly higher than the rated pressure of 12 MPa of the high-pressure steam turbine 31, for example. As such, once the above-described switching condition has been met, the high-pressure turbine bypass valve 68 does not open as long as the pressure P2 in the main steam line 41 does not become greater than or equal to 12.1 MPa.

As described above, the temperature of the steam exhausted from the high-pressure steam turbine 31 rises due to windage loss during the process of the main steam regulator valve 62 gradually opening and the high-pressure steam being gradually supplied to the high-pressure steam turbine 31. As such, in the present embodiment, in the process of starting up the high-pressure steam turbine 31, the ventilator valve 71 is open and the steam exhausted from the high-pressure steam turbine 31 is sent to the condenser 36 via the ventilator line 52, as shown in FIG. 3. Thus, in the present embodiment, a pressure difference between pressures at the steam inlet and the steam outlet of the high-pressure steam turbine 31 increases, and the workload of the steam in the high-pressure steam turbine 31 increases, thereby minimizing an increase in the temperature of the steam exhausted from the high-pressure steam turbine 31.

The ventilator valve 71 closes upon the determination unit 111 of the ventilator valve controller 110 determining that the flow rate of the high-pressure steam supplied to the high-pressure steam turbine 31 has reached a stipulated flow rate. Specifically, the determination unit 111 of the ventilator valve controller 110 determines whether or not the flow rate of the high-pressure steam supplied to the high-pressure steam turbine 31 has reached the stipulated flow rate on the basis of the pressure P1 detected by the inflow steam pressure gauge 82 (a step of determining). The flow rate of the high-pressure steam supplied to the high-pressure steam turbine 31 and the pressure P1 detected by the inflow steam pressure gauge 82 have a positive correlation. As such, by using the pressure P1 detected by the inflow steam pressure gauge 82 to set a pressure corresponding to the stipulated flow rate for the flow rate of the high-pressure steam as a threshold, the determination unit 111 can determine whether or not the flow rate of the high-pressure steam has reached the stipulated flow rate by determining whether or not the pressure P1 detected by the inflow steam pressure gauge 82 has reached the threshold.

This threshold is changed by the threshold alteration unit 114 of the ventilator valve controller 110 in accordance with the startup mode of the exhaust heat recovery boiler 20. Immediately before steam is supplied to the high-pressure steam turbine 31, in the case where the temperature of the high-pressure steam turbine 31 detected by the thermometer 83 provided in the high-pressure steam turbine 31 is greater than or equal to 400° C., for example, the startup mode recognition unit 113 recognizes that the startup mode is the hot mode, whereas in the case where the temperature of the high-pressure steam turbine 31 detected by the thermometer 83 is less than 400° C., for example, the startup mode recognition unit 113 recognizes that the startup mode is the cold mode (a step of recognizing the startup mode). The threshold alteration unit 114 sets the threshold to 4 MPa, for example, in the case where the startup mode recognized by the startup mode recognition unit 113 is the hot mode. On the other hand, the threshold alteration unit 114 sets the threshold to 2 MPa, for example, in the case where the startup mode recognized by the startup mode recognition unit 113 is the cold mode (a step of altering the threshold).

Upon the determination unit 111 determining that the flow rate of the high-pressure steam flowing into the high-pressure steam turbine 31 has reached the stipulated flow rate, or in other words, that the pressure P1 detected by the inflow steam pressure gauge 82 has reached the threshold, the command output unit 112 of the ventilator valve controller 110 outputs the close command to the ventilator valve 71 (a step of outputting a command). The close command also includes a parameter for setting a lift change rate, which is a lift change amount per unit time, of the ventilator valve 71 to a predetermined lift change rate. Upon receiving this close command, the ventilator valve 71 gradually closes at the predetermined lift change rate.

Figure 4:
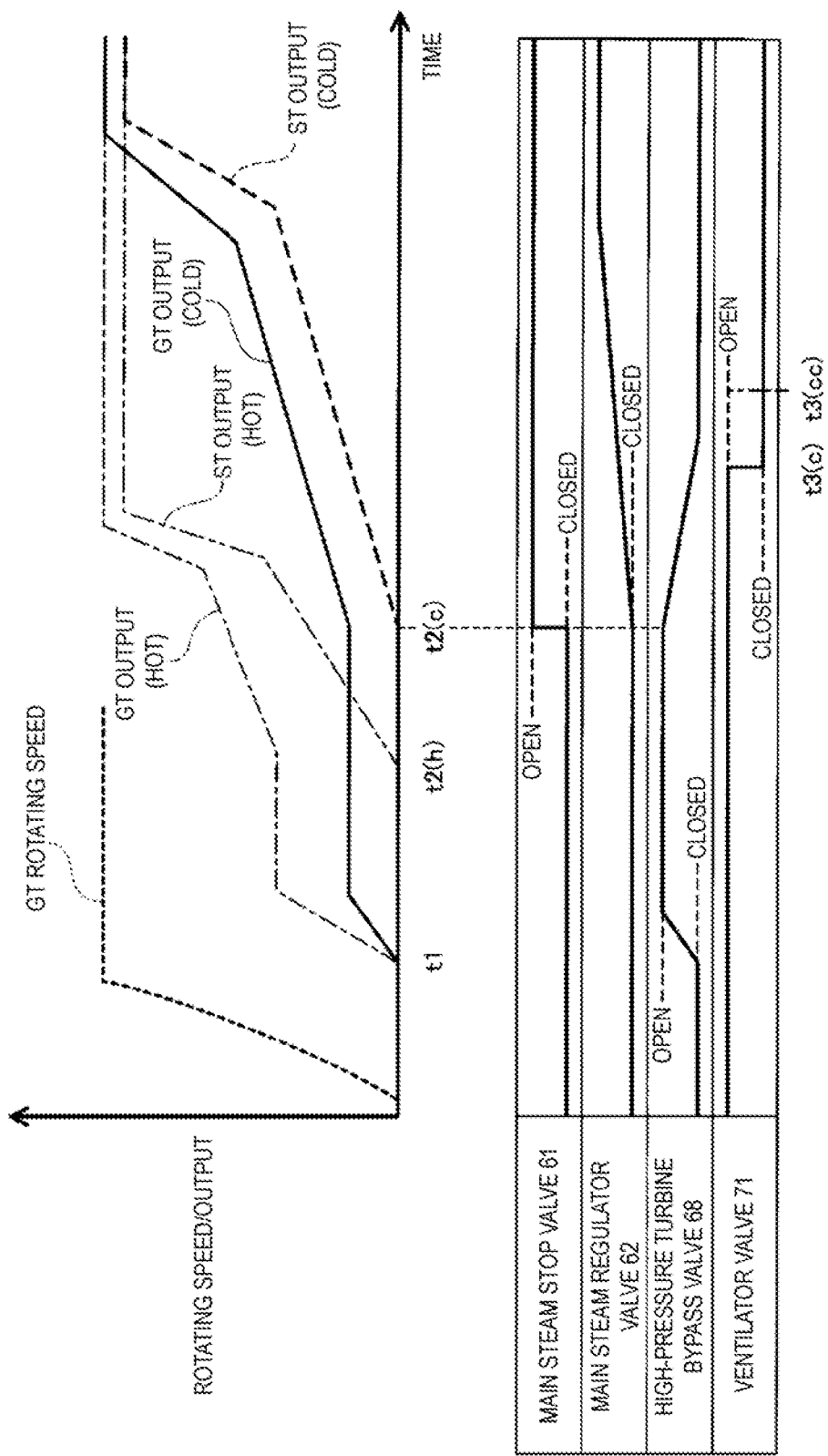
FIG. 4 is a timing chart showing changes over time in outputs and valve operations in the case where the startup mode is a cold mode in the combined cycle plant according to the embodiment of the present invention.

Here, differences in the timings of the operations of the valves between the case where the startup mode is the hot mode and the case where the startup mode is the cold mode will be described using FIGS. 3 and 4. FIG. 3 is a timing chart for the case where the startup mode is the hot mode, and FIG. 4 is a timing chart for the case where the startup mode is the cold mode.

A timing t1, when the output of the gas turbine 10 is first obtained, is basically the same in the hot mode and the cold mode. However, an amount of time until the output of the gas turbine 10 reaches a rated output is longer in the cold mode than in the hot mode.

The conditions for opening the steam stop valves 61, 64, and 66 and the steam regulator valves 62, 65, and 67 of the steam turbines 31, 32, and 33, or in other words, the conditions for starting the supply of the steam to the steam turbines 31, 32, and 33, are the same in the hot mode and in the cold mode. However, in the cold mode, the temperature of water retained in the exhaust heat recovery boiler 20, and the temperatures of the metals of the steam turbines 31, 32, and 33 are lower than in the hot mode, and thus the timings at which the conditions for starting the supply of the steam to the steam turbines 31, 32, and 33 are met are later than in the hot mode. Accordingly, in the cold mode, the timings at which the steam stop valves 61, 64, and 66 and the steam regulator valves 62, 65, and 67 of the steam turbines 31, 32, and 33 open, and furthermore, a timing t2($c$) at which the outputs of the steam turbines 31, 32, and 33 are first obtained, are later than the corresponding timing t2($h$) in the hot mode.

Furthermore, the lift change rates, which are lift change amounts per unit time, of the steam regulator valves 62, 65, and 67 of the steam turbines 31, 32, and 33 are lower in the cold mode than in the hot mode. To rephrase, the steam regulator valves 62, 65, and 67 of the steam turbines 31, 32, and 33 open more slowly in the cold mode than in the hot mode. Accordingly, the outputs of the steam turbines 31, 32, and 33 increase more slowly in the cold mode than in the hot mode.

The pressures to be held in the respective steam lines during the process of starting up the plant are the same in both the hot mode and the cold mode. In other words, in both the hot mode and the cold mode, during the process of starting up the plant, the high-pressure turbine bypass valve 68 is controlled so that the pressure P2 in the main steam line 41 is held at 5 MPa. Furthermore, the mid-pressure turbine bypass valve 72 is controlled so that the pressure P3 in the post-reheat steam line 42$b$ is held at 2 MPa, and the low-pressure turbine bypass valve 73 is controlled so that the pressure P4 in the low-pressure steam line 43 is held at 0.5 MPa.

During the process of starting up in the hot mode, the temperature of the first-stage vane ring in the high-pressure steam turbine 31 is greater than or equal to 400° C. Accordingly, during the process of starting up in the hot mode, the startup mode recognition unit 113 of the ventilator valve controller 110 recognizes that the startup mode is the hot mode. As described earlier, the threshold alteration unit 114 sets the threshold to 4 MPa, for example, in the case where the startup mode recognized by the startup mode recognition unit 113 is the hot mode. Accordingly, during the process of starting up in the hot mode, the determination unit 111 determines that the flow rate of the high-pressure steam flowing into the high-pressure steam turbine 31 has reached the stipulated flow rate upon the pressure P1 detected by the inflow steam pressure gauge 82 reaching 4 MPa. The command output unit 112 of the ventilator valve controller 110 outputs the close command to the ventilator valve 71 upon the determination unit 111 determining that the stipulated flow rate has been reached. As shown in FIG. 3, upon receiving this close command, the ventilator valve 71 closes at the predetermined lift change rate (t3($h$)).

Meanwhile, during the process of starting up in the cold mode, the temperature of the first-stage vane ring in the high-pressure steam turbine 31 is less than 400° C. Accordingly, during the process of starting up in the cold mode, the startup mode recognition unit 113 of the ventilator valve controller 110 recognizes that the startup mode is the cold mode. As described earlier, the threshold alteration unit 114 sets the threshold to 2 MPa, for example, in the case where the startup mode recognized by the startup mode recognition unit 113 is the cold mode. Accordingly, during the process of starting up in the cold mode, the determination unit 111 determines that the flow rate of the high-pressure steam flowing into the high-pressure steam turbine 31 has reached the stipulated flow rate upon the pressure P1 detected by the inflow steam pressure gauge 82 reaching 2 MPa. The command output unit 112 of the ventilator valve controller 110 outputs the close command to the ventilator valve 71 upon the determination unit 111 determining that the stipulated flow rate has been reached, as described earlier. As shown in FIG. 4, upon receiving this close command, the ventilator valve 71 closes at the predetermined lift change rate (t3($c$)).

In the present embodiment, assume that in the hot mode, the amount of the high-pressure steam generated by the high-pressure steam generating part 21 immediately before the ventilator valve 71 begins to close is 200 t/h. Furthermore, assume that of this high-pressure steam, the flow rate of the high-pressure steam flowing into the post-reheat steam line 42$b$ through the high-pressure turbine bypass valve 68 and the reheat section 26 of the exhaust heat recovery boiler 20 is 100 t/h, and the flow rate of the high-pressure steam that flows into the condenser 36 via the ventilator valve 71 is 100 t/h. In this case, ignoring the mid-pressure steam generated by the mid-pressure steam generating part 23, the flow rate of the steam flowing in the post-reheat steam line 42$b$ changes from 100 t/h to 200 t/h between before and after the ventilator valve 71 closes.

In addition, in the present embodiment, assume that in the cold mode, the amount of the high-pressure steam generated by the high-pressure steam generating part 21 immediately before the ventilator valve 71 begins to close is 150 t/h. Furthermore, assume that of this high-pressure steam, the flow rate of the high-pressure steam flowing into the post-reheat steam line 42*b* through the high-pressure turbine bypass valve 68 and the reheat section 26 of the exhaust heat recovery boiler 20 is 100 t/h, and the flow rate of the high-pressure steam that flows into the condenser 36 via the ventilator valve 71 is 50 t/h. In this case, as described earlier, ignoring the mid-pressure steam generated by the mid-pressure steam generating part 23, the flow rate of the steam flowing in the post-reheat steam line 42*b* changes from 100 t/h to 150 t/h between before and after the ventilator valve 71 closes.

Here, an example in which the threshold for determining whether or not the flow rate of the high-pressure steam flowing into the high-pressure steam turbine 31 has reached the stipulated flow rate in the cold mode is the same as in the hot mode will be described as a comparative example. Like the cold mode in the present embodiment, this comparative example assumes that in the cold mode, the amount of the high-pressure steam generated by the high-pressure steam generating part 21 immediately before the ventilator valve 71 begins to close is 150 t/h. According to this comparative example, the threshold for determining whether or not the flow rate of the high-pressure steam flowing into the high-pressure steam turbine 31 has reached the stipulated flow rate (4 MPa, corresponding to a stipulated flow rate of 100 t/h) is set to be the same in both the cold mode and the hot mode, and thus the flow rate of the high-pressure steam flowing into the condenser 36 via the ventilator valve 71 immediately before the ventilator valve 71 begins to close is 100 t/h. To rephrase, as illustrated in FIG. 4, a timing t3(*cc*) when the ventilator valve 71 closes in the comparative example is later than the timing t3(*c*) at which the ventilator valve 71 closes in the present embodiment. As a result, of the amount of high-pressure steam generated by the high-pressure steam generating part 21, the flow rate of the high-pressure steam flowing into the post-reheat steam line 42*b* through the high-pressure turbine bypass valve 68 and the reheat section 26 of the exhaust heat recovery boiler 20 becomes 50 t/h (=150 t/h−100 t/h). Accordingly, in this comparative example, ignoring the mid-pressure steam generated, by the mid-pressure steam generating part 23, the flow rate of the steam flowing in the post-reheat steam line 42*b* changes from 50 t/h to 150 t/h between before and after the ventilator valve 71 closes in the cold mode.

Accordingly, the flow change rate of the steam flowing in the post-reheat steam line 42*b* between before and after the ventilator valve 71 closes is greater in the cold mode according to the comparative example than in the cold mode and the hot mode according to the present embodiment. As such, in the cold mode according to the comparative example, there is a greater chance that a control system for the reheat steam line 42, and more specifically, a control system that carries out control on the basis of a state quantity of the steam passing through the post-reheat steam line 42*b*, will become unstable.

However, as described above, according to the present embodiment, the threshold for determining whether or not the flow rate of the high-pressure steam flowing into the high-pressure steam turbine 31 has reached the stipulated flow rate is set to 4 MPa (corresponding to a stipulated flow rate of 100 t/h) in the hot mode and to 2 MPa (corresponding to a stipulated flow rate of 50 t/h) in the cold mode. Thus according to the present embodiment, even in the cold mode, the flow change rate of the steam flowing in the post-reheat steam line 42*b* between before and after the ventilator valve 71 closes can be kept comparatively low, in the same manner as in the hot mode, which makes it possible to prevent the control system for the reheat steam line 42 from becoming unstable.

In the process of starting up the plant, the temperature of the high-pressure steam from the high-pressure steam generating part 21 and the amount of the high-pressure steam generated have a positive correlation. In other words, in the process of starting up the plant, a greater amount of the high-pressure steam is generated as the temperature of the high-pressure steam from the high-pressure steam generating part 21 rises, whereas a smaller amount of the high-pressure steam is generated as the temperature of the high-pressure steam from the high-pressure steam generating part 21 drops. In addition, in the process of starting up the plant, the flow rate of the high-pressure steam supplied to the high-pressure steam turbine 31 increases as the temperature of the high-pressure steam rises. Accordingly, in the process of starting up the plant, the temperature of the high-pressure steam and the flow rate of the high-pressure steam supplied to the high-pressure steam turbine 31 have a positive correlation. The inventor focused on these points, and in the present embodiment, the threshold with which the determination unit 111 determines whether or not the stipulated flow rate has been reached is altered with the threshold positively correlated with the temperature of the high-pressure steam. As such, according to the present embodiment, the stipulated flow rate decreases when the amount of the high-pressure steam generated by the high-pressure steam generating part 21 is small, and the flow change rate of the steam flowing in the post-reheat steam line 42*b* between before and after the ventilator valve 71 closes can be reduced.

In the embodiment described above, the startup mode of the exhaust heat recovery boiler 20 is recognized in accordance with the temperature detected by the thermometer 83 provided in the high-pressure steam turbine 31. However, the startup mode of the exhaust heat recovery boiler 20 may be recognized as the hot mode in the case where the current startup of the gas turbine 10 is within a predetermined amount of time from when the gas turbine 10 was stopped previously, and the startup mode of the exhaust heat recovery boiler 20 may be recognized as the cold mode in the case where the predetermined amount of time is exceeded.

In addition, in the embodiment described above, the threshold is changed in accordance with the startup mode of the exhaust heat recovery boiler 20. However, as indicated by the imaginary line in FIG. 1, a thermometer 89 may be provided in the main steam line 41 and the threshold may be changed in accordance with a temperature of the high-pressure steam detected by the thermometer 89. In this case, the threshold is raised when the temperature of the high-pressure steam is high and the threshold is lowered when the temperature of the high-pressure steam is low. In other words, in this case, the ventilator valve controller 110 does not recognize the startup mode of the exhaust heat recovery boiler 20.

In addition, although two values are employed as thresholds in the foregoing, more than two values may be employed. For example, assume that the startup modes of the exhaust heat recovery boiler 20 include a hot mode in which the high-pressure steam turbine 31 is greater than or equal to 450° C., a warm mode in which the temperature of the high-pressure steam turbine 31 is less than 450° C. and greater than or equal to 350° C., and a cold mode in which the temperature of the high-pressure steam turbine 31 is less than 350° C. In this case, the threshold in the hot mode may be set to 4 MPa, the threshold in the warm mode may be set to 3 MPa, and the threshold in the cold mode may be set to 2 MPa.

In the foregoing, a specific pressure of the high-pressure steam flowing into the high-pressure steam turbine 31 is taken as the threshold used by the determination unit 111 to determine whether or not the stipulated flow rate has been reached. However, a flowmeter that detects the flow rate of the high-pressure steam flowing into the high-pressure steam turbine 31 may be provided, and a specific flow rate detected by the flowmeter may then be taken as the threshold used by the determination unit 111 to determine whether or not the stipulated flow rate has been reached.

In addition, in the foregoing, the close command issued to the ventilator valve 71 includes a parameter for setting a lift change rate, which is a lift change amount per unit time, of the ventilator valve 71 to a predetermined lift change rate. Accordingly, this lift change rate may be altered with the lift change rate positively correlated with the temperature of the high-pressure steam. In other words, the lift change rate may be increased in the case where the temperature of the high-pressure steam is high, and the lift change rate may be reduced in the case where the temperature of the high-pressure steam is low.

In addition, the combined cycle plant according to the present embodiment includes three steam turbines, namely the high-pressure steam turbine 31, the mid-pressure steam turbine 32, and the low-pressure steam turbine 33. However, the present invention can also be applied in the case where a first steam turbine corresponding to the high-pressure steam turbine 31 of the present embodiment and a second steam turbine corresponding to the mid-pressure steam turbine 32 of the present embodiment are included but a steam turbine corresponding to the low-pressure steam turbine 33 of the present embodiment is not included.

INDUSTRIAL APPLICABILITY

According to an aspect of the present invention, a control system for a reheat steam line can be prevented from becoming temporarily unstable.

REFERENCE SIGNS LIST

10 Gas turbine
11 Compressor
12 Combustor
20 Exhaust heat recovery boiler
21 High-pressure steam generating part (first steam generating part)
23 Mid-pressure steam generating part
26 Reheat section
27 Low-pressure steam generating part
31 High-pressure steam turbine (first steam turbine)
32 Mid-pressure steam turbine (second steam turbine)
33 Low-pressure steam turbine
34 Generator
36 Condenser
41 Main steam line (first steam line)
42 Reheat steam line
42a Pre-reheat steam line
42b Post-reheat steam line
43 Low-pressure steam line
44 Feed water line
51 High-pressure turbine bypass line (first bypass line)
52 Ventilator line (second bypass line)
53 Mid-pressure turbine bypass line
54 Low-pressure turbine bypass line
61 Main steam stop valve
62 Main steam regulator valve
64 Reheat steam stop valve
65 Reheat steam regulator valve
66 Low-pressure steam stop valve
67 Low-pressure steam regulator valve
68 high-pressure turbine bypass valve
71 Ventilator valve
72 Mid-pressure turbine bypass valve
73 Low-pressure turbine bypass valve
81 High-pressure steam pressure gauge
82 Inflow steam pressure gauge
83, 89 Thermometer
84 Reheat steam pressure gauge
85 Low-pressure steam pressure gauge
86 Output meter
100 Control device
110 Ventilator valve controller
111 Determination unit
112 Command output unit
113 Startup mode recognition unit
114 Threshold alteration unit

The invention claimed is:

1. A control device for a combined cycle plant, the combined cycle plant including a gas turbine driven by a combustion gas, an exhaust heat recovery boiler that generates steam using heat of a combustion gas exhausted from the gas turbine, first and second steam turbines driven by the steam, and a condenser that condenses a steam exhausted from the second steam turbine back into water, the exhaust heat recovery boiler including a first steam generating part that generates first steam to be supplied to the first steam turbine using the heat of the combustion gas, and a reheat section that heats a steam exhausted from the first steam turbine, the first steam generating part of the exhaust heat recovery boiler and the first steam turbine being connected by a first steam line that conducts the first steam to the first steam turbine, the first steam turbine and the second steam turbine being connected by a reheat steam line that conducts the steam exhausted from the first steam turbine to the second steam turbine via the reheat section of the exhaust heat recovery boiler, a pre-reheat steam line spanning from the first steam turbine to the reheat section in the reheat steam line and the first steam line being connected by a first bypass line, the pre-reheat steam line and the condenser being connected by a second bypass line, and a ventilator valve that adjusts a flow rate of steam passing through the second bypass line being provided in the second bypass line, the control device comprising:

a determination unit that determines, on the basis of a set threshold, whether or not a flow rate of the first steam flowing into the first steam turbine has reached a stipulated flow rate in a process of starting up the first steam turbine and the second steam turbine;

a command output unit that, upon the determination unit determining that the flow rate of the first steam flowing into the first steam turbine has reached the stipulated flow rate, outputs a close command to close the ventilator valve that is open; and a threshold alteration unit that alters the threshold in accordance with a type of a startup mode of the exhaust heat recovery boiler.

2. The control device according to claim 1, wherein the threshold is a value regarding a pressure of the first steam flowing into the first steam turbine.

3. The control device according to claim 1, wherein
the threshold is a pressure of the first steam corresponding to the stipulated flow rate of the first steam flowing into the first steam turbine.

4. The control device according to claim 1, further comprising:
a startup mode recognition unit that recognizes whether the startup mode of the exhaust heat recovery boiler is at least a cold mode or a hot mode, wherein
the threshold alteration unit alters the threshold in accordance with the type of the startup mode recognized by the startup mode recognition unit.

5. The control device according to claim 4, wherein
the startup mode recognition unit recognizes the type of the startup mode in accordance with a temperature of a steam contact part of the first steam turbine detected by a thermometer.

6. A combined cycle plant comprising:
the control device according to claim 1;
the gas turbine;
the exhaust heat recovery boiler;
the first steam turbine;
the second steam turbine; and
the condenser.

7. A control method for a combined cycle plant, the combined cycle plant including a gas turbine driven by a combustion gas, an exhaust heat recovery boiler that generates steam using heat of a combustion gas exhausted from the gas turbine, first and second steam turbines driven by the steam, and a condenser that condenses a steam exhausted from the second steam turbine back into water, the exhaust heat recovery boiler including a first steam generating part that generates first steam to be supplied to the first steam turbine using the heat of the combustion gas, and a reheat section that heats a steam exhausted from the first steam turbine, the first steam generating part of the exhaust heat recovery boiler and the first steam turbine being connected by a first steam line that conducts the first steam to the first steam turbine, the first steam turbine and the second steam turbine being connected by a reheat steam line that conducts the steam exhausted from the first steam turbine to the second steam turbine via the reheat section of the exhaust heat recovery boiler, a pre-reheat steam line spanning from the first steam turbine to the reheat section in the reheat steam line and the first steam line being connected by a first bypass line, the pre-reheat steam line and the condenser being connected by a second bypass line, and a ventilator valve that adjusts a flow rate of steam passing through the second bypass line being provided in the second bypass line;
the control method performed by a control device comprising a determination unit, a command output unit, and a threshold alteration unit;
the control method comprising the steps of:
determining by the determination unit, on the basis of a set threshold, whether or not a flow rate of the first steam flowing into the first steam turbine has reached a stipulated flow rate in a process of starting up the first steam turbine and the second steam turbine;
outputting by the command output unit, upon determining in the step of determining that the flow rate of the first steam flowing into the first steam turbine has reached the stipulated flow rate, a close command to close the ventilator valve that is open; and
altering by the threshold alteration unit, the threshold in accordance with a type of a startup mode of the exhaust heat recovery boiler.

8. The control method for a combined cycle plant according to claim 7, wherein
the threshold is a value regarding a pressure of the first steam flowing into the first steam turbine.

9. The control method for a combined cycle plant according to claim 7, wherein
the threshold is a pressure of the first steam corresponding to the stipulated flow rate of the first steam flowing into the first steam turbine.

10. The control method for a combined cycle plant according to claim 7, further comprising the step of:
recognizing whether the startup mode of the exhaust heat recovery boiler is at least a cold mode or a hot mode, wherein
the threshold is altered in the step of altering the threshold in accordance with the type of the startup mode recognized in the step of recognizing the startup mode.

11. The control method for a combined cycle plant according to claim 10, wherein
in the step of recognizing the startup mode, the type of the startup mode is recognized in accordance with a temperature of a steam contact part of the first steam turbine detected by a thermometer.

* * * * *